United States Patent [19]

Ludwig

[11] 4,084,825

[45] Apr. 18, 1978

[54] COUNTER PUMPING DEBRIS EXCLUDER AND SEPARATOR

[75] Inventor: Lawrence P. Ludwig, Fairview Park, Ohio

[73] Assignee: The United States of America as represented by the Administrator of the National Aeronautics and Space Administration, Washington, D.C.

[21] Appl. No.: 672,222

[22] Filed: Mar. 31, 1976

[51] Int. Cl.² ............................................. F16J 15/40
[52] U.S. Cl. ..................................... 277/25; 277/134
[58] Field of Search .................... 277/25, 134, DIG. 4

[56] References Cited

U.S. PATENT DOCUMENTS

| | | | |
|---|---|---|---|
| 3,746,350 | 7/1973 | Mayer et al. | 277/134 |
| 3,843,140 | 10/1974 | Mayer et al. | 277/134 |
| 3,940,150 | 2/1976 | Martin et al. | 277/134 |

*Primary Examiner*—Robert I. Smith

*Attorney, Agent, or Firm*—Norman T. Musial; John R. Manning; Gene E. Shook

[57] ABSTRACT

This application discloses a dirt separator and excluder for removing entrained debris from gas turbine shaft seals. A helical groove pattern is constructed on the rotating shaft with the pumping pattern such that it tends to pump seal pressurizing gas toward the gas turbine seal. A second helical groove pattern is provided on the stationary housing or counter rotating member coaxial with the shaft, and this pattern is designed to provide pumping in the direction opposite from that of the groove pattern on the shaft. Gas with entrained debris entering this grooved area will be subjected to high centrifugal forces due to the swirl motion induced by the groove pattern and the rotation of the shaft. This debris is centrifuged outwardly into the outer groove pattern on the housing or counter rotating member. Since the outer groove pattern has a pumping direction opposite from that of the seal, dirt is pumped away from the seal and can be collected in a suitable debris trap remote from the seal location.

3 Claims, 2 Drawing Figures

COUNTER PUMPING DEBRIS EXCLUDER AND SEPARATOR

ORIGIN OF THE INVENTION

The invention described herein may be manufactured and used by or for the Government of the United States of America for governmental purposes without the payment of any royalties thereon or therefor.

BACKGROUND OF THE INVENTION

1. Field of the Invention

This invention relates to particle separators for use in gas turbine engines.

2. Prior Art

Gas turbine engines have found commercial and military application in a variety of uses. In many of these applications, the engine must operate in an environment laden with dirt and debris. One classic example is the use of gas turbine engines for use in helicopter or VTOL aircraft. These types of aircraft tend to create upon landing or take off an area containing a large volume of entrained dirt and debris. The ingestion of such dirt, sand, or other contaminants into the engine itself may result in considerable damage to the engine in a variety of ways. For example, foreign particles ingested in the engine can rapidly erode the impeller blades, as well as severely damaging compressor elements. When this ingestion occurs, the desired balance condition of the compressor is often distorted and the useful lifetime of the engine is shortened, and in many cases, destoryed. At a minimum, considerable downtime results while engine repairs are effectuated.

Within the prior art, a variety of techniques are known which attempt to reduce the ingestion of contaminants into such engines. A first type of device can be categorized as a barrier type filter, such as an inlet screen or a series of baffles. These inlet screens, or the like, prevent the ingestion of sizeable foreign objects; however, they are not without material shortcomings. Devices of that type may easily become clogged with contaminants and thereby restrict the airflow into the engine such that the large volume of air required for efficient performance is reduced. Hence, while barrier type filters may provide sufficient efficiency in terms of removing dirt, nevertheless, this efficiency is accomplished while compromising engine performance as a result of substantial constriction of intake airflow. Additionally, it has been found that inlet screens of this type can produce a safety hazard when ice forms over the screen itself. Additionally, in some extreme circumstances, the screens themselves break up with disastrous results to the engine.

Another technique known in the prior art to catch sand and entrained dust before entering the turbine engine consists in the installation of an air particle separator comprising approximately 1300 so called strata tubes per engine, each tube having a diameter of approximately 1.5 inches and an overall length of approximately 4 inches. Separators of this known design, while proving relatively successful, are expensive and space consuming. Also, they by nature of their construction result in weight penalties which, in the case of VTOL aircraft, cannot be tolerated.

A second class of devices used for separating entrained debris from gas turbine engines utilizes a rotor structure with veins so configured to provide a high centrifugal force to incoming air, thereby forcing the entrained dirt toward the outer wall of the separator from which point it can be directed to a suitable debris collector. Typical of this art is the patent to Robbins, U.S. Pat. No. 3,302,395. As shown best in FIG. 1 of the Robbins patent, a debris rotor 15 utilizes a helical vein 19 configured at a predetermined orientation such that a high angular velocity is produced in the field of flow as air flows from the inlet through veins 23 to the compressor 5 of the engine. Foreign material such as dirt, sand, water and the like are mixed in the vortex of this swirling air and are, accordingly, centrifuged toward the outer walls of the annular passage 27, and, hence, through the engine bypass ejector duct 29 without ingestion into the compressor sections 5 of the engine. Air which is relatively uncontaminated in suitable amounts for aircraft operation is passed through the center of the engine into the compressor section 5, and, hence, to the combustion section 7 for the production of thrust in the usual manner. Robbins, in FIG. 2, shows an alternative embodiment not utilizing passage through the engine bypass, but, alternatively, utilizes a trap door structure 43 which is used to vent material contained in the debris collection chamber 41 at the extremity of the outer peripheral surface of the stator structure of the compressor 33. Hence, materials which are collected in chamber 45 are conveniently exhausted upon the opening of door 43.

Another variation is shown in the patent to Alsobrooks, U.S. Pat. No. 3,444,672, which discloses in FIG. 2 an air cleaner for turbine engines. Basically, as shown in the figure, air passing through the housing 16 is rotated by means of impeller blades 32 such that the air flow is confined immediately adjacent to the outer periphery of air passage 19. Air bearing a higher concentration of foreign particles will be present immediately adjacent the housing 16, and the cleaner will pass immediately adjacent to the fairing 43 due to the heavier weight of the foreign particles. As a consequence, this cleaner air will be induced into the gas turbine 12 through the discharge passage defined in FIG. 2 as a cylindrical extension 44. In contrast, air bearing a larger percentage of foreign debris or particles is discharged to the atmosphere through a dirt collector scroll 45 formed by the housing 16 adjacent the air outlet 18, which interacts with a flow restrictor passage 47. An outlet duct 48 is provided such that air and the heavier foreign particles separated from the air induced into the gas turbine 12 can be conveniently redistributed into the atmosphere. A similar system is shown in the patent to Roberts, U.S. Pat. No. 3,557,537, and also in Flatt, U.S. Pat. No. 3,616,616.

A slightly modified configuration utilizing centrifugal flow with a helical or spiral vein system is shown in Wilkinson, U.S. Patent No. 3,469,566. In this patent, as shown best in FIG. 3, air enters the system through inlet 18. A concentric central tube 20, having a closed front end 20', is provided on its exterior surfaces with a set of spiral baffles or veins 21. These veins impart a swirling action into the air incoming at 18 such that the large or heavier particles of dust, dirt, etc. are centrifugally extracted from the incoming air, and as a dirty airstream are discharged into chamber 15 at position 19. Relatively clean air flows inwardly into the central tube 20 at location 23 through a series of apertures 23, which are located downstream from the veins 21. This clean air then passes through outlet 24 or utilization in the engine.

SUMMARY OF THE INVENTION

Prior art devices utilizing swirl chamber, typified by Robbins and Wilkinson et al, require high air flow velocities for the separation of dirt. These flow velocities are obtained through flow acceleration by means of a pressure drop in the fluid flow as the velocity increases. This pressure drop represents an efficiency loss in the engine, and, additionally, in cases where utilization is effectuated to remove particles from the seal pressurizing gas, the resulting acceleration results in a pressure drop in the fluid flow of this gas. Additionally, the air flow in the separator is greater than the seal leakage, and thus some of the seal gas is dumped into the low pressure area.

Accordingly, it is a principle object of this invention to provide an air cleaner for gas turbine engines that not adversely affect the performance of the engine.

It is another object of this invention to provide for a separator to remove entrained dirt from gas turbine shaft seals without a net pressure drop in the system.

Still another object of this invention is to provide a device that tends to pump seal pressurizing gas toward the seal in a gas turbine engine while at the same time removing entrained dirt and contaminants from that gas.

Yet another object of this invention is to provide a system for gas turbines which will require a minimum of space, be of light weight, yet remove debris entrained in a fluid.

These and other objects of this invention are attained in a system which utilizes a counter pumping helical groove pattern on the stationary housing or counter rotating member to provide a pumping action in a direction away from the seal. Hence, in conjunction with the high centrifugal force field which is produced by the swirl motion induced by the helical groove pattern on the rotating shaft, debris is centrifuged outward into the outer groove pattern on the housing. Since the pumping direction of this pattern is away from the seal, debris is effectively pumped away from the seal and can be collected in a suitable trap at a remote location. However, in view of the fact that the helical pattern on the rotating member is designed to pump and seal pressurizing gas toward the seal in the engine, pressure losses are minimized.

DESCRIPTION OF THE PREFERRED EMBODIMENT

Figure 2:
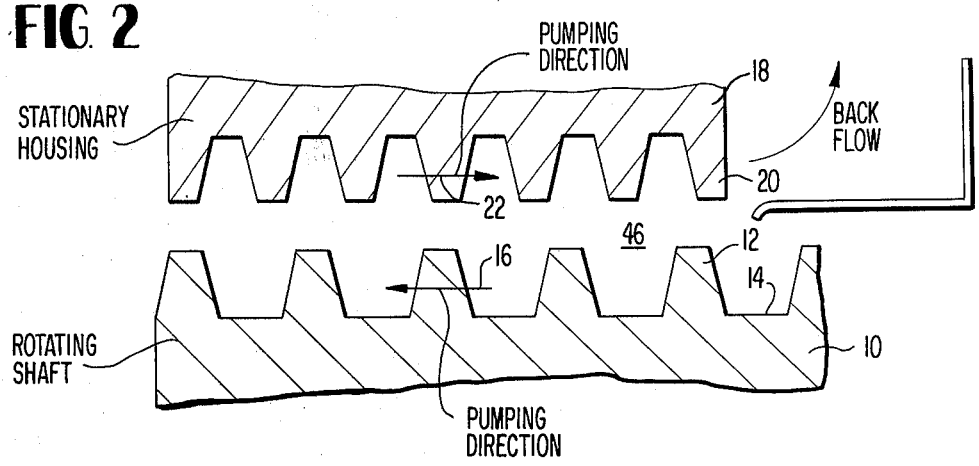
FIG. 2 is a schematic drawing showing the relationship of pumping directions.

Referring first to FIG. 2, the essence of applicant's invention is shown in schematic form. A helical groove pattern on the rotating shaft of an engine, typically a gas turbine engine, is shown in FIG. 2 on rotating shaft 10. The grooved pattern consists of a series of teeth 12 defining a groove pattern 14 having a pumping direction as shown by the arrow 16 in FIG. 2. The direction of the groove pattern is such that it tends to pump seal pressurizing gas towards the seal. Generally, in gas turbine engines, because of leakage at the seals, the seal pressurizing gas generally has a flow toward the seal, and the helical groove pattern on the shaft will aid in the flow of this pressurizing gas. As previously, indicated, however, this fluid may contain debris or contaminants which tend to have a deteriorating effect on engine performance. Accordingly, it is desired to remove such debris from the seal area. In this regard, the entrained debris entering the grooved area is subjected to a high centrifugal force due to the swirl motion induced by the groove pattern 14, and the rotation of the shaft 10. As a result, the debris is centrifuged toward the outer housing 18 which is stationary. The outer housing 18 contains a second helical groove pattern defined by teeth 20 such that the pumping direction of that groove pattern shown by the arrow 22 is opposite from that of the pumping direction indicated by the arrow 16. Since the outer groove pattern has a pumping direction away from the seal, dirt which is entrained in the pressurizing gas is pumped away from the seal and can be collected in a suitable debris trap (not shown).

Figure 1:
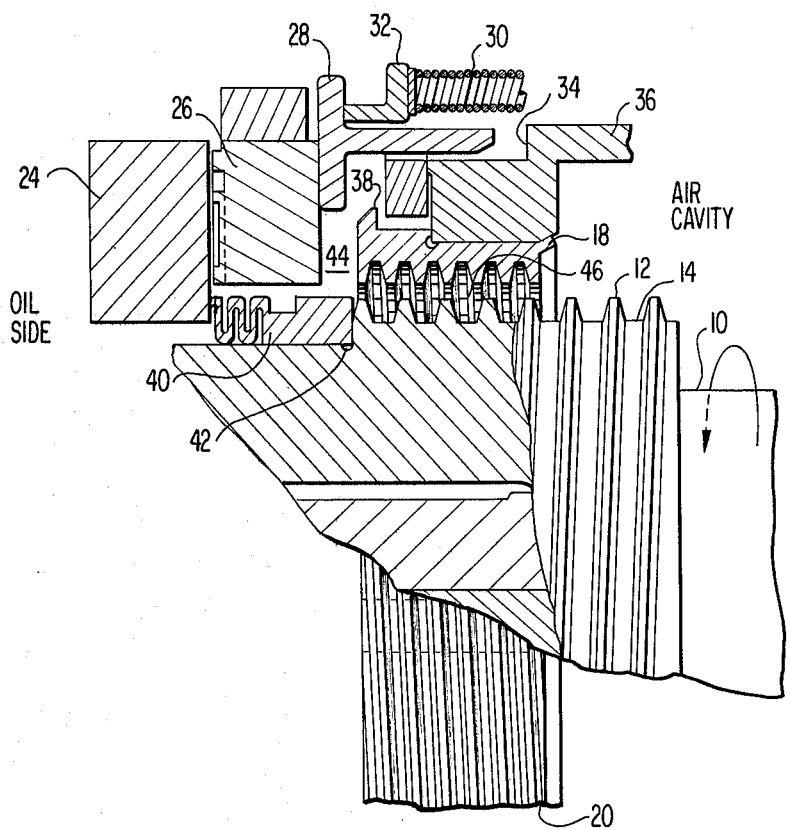
FIG. 1 is a side perspective view of a portion of a gas turbine engine showing, in a broken away portion, the system comprising this invention.

Referring now to FIG. 1, a side perspective view of a portion of a gas turbine engine showing, in a break away portion, the system comprising this invention is shown. The rotating shaft depicted in FIG. 2 is shown with a similar numeral 10 in FIG. 1. Also, the helical groove pattern 14, defined by the helical winding 12 is shown. Additionally, in FIG. 1 the stationary housing 18 is depicted with its helical groove pattern 20. A seal seat 24 is shown on the oil side of the FIG. 1 configuration, the seat having a carbon nose 26 in operative abutment therewith. The carbon nose 26 is held in operative contact with the seal seat 24 by means of biasing means 28. Biasing means 28 is urged into contact with carbon nose 26 by means of spring means 30 and push rod 32 interposed therebetween.

The seal seat 24 is positioned relative to the rotating windback 10 by means of alignment means 40 in operative contact with rotating means 10 and sealed therebetween to prevent leakage of pressurizing gas by means of a seal (not shown) in space 42. Between the seal seat 24 and the carbon nose 26, there is defined a chamber 44 extending through the space between helical groove patterns 14 and 20 such that seal pressurizing gas can be pumped toward the seat seal 24. As described in conjunction with the operation schematically in FIG. 2, in the FIG. 1 embodiment, rotation of the rotating windback 10 generally tends to produce a swirling effect within the space 46 such that entrained debris will be centrifuged from the helical groove pattern 14 onto the stationary groove pattern 20 and collected in a suitable debris trap in the air cavity.

Accordingly, dirt can be pumped away from the seal without a net fluid pressure drop in the system while obtaining separation of the debris from the seal pressurizing gas.

While in the foregoing there has been described and shown the preferred embodiment of the invention, various modifications may become apparent to those skilled in the art to which the invention relates. For example, while the invention has been particularly described with relation to a gas turbine engine, it is readily apparent that the invention can be applied in any configuration utilizing a rotating windback and stationary housing wherein a pumping fluid is directed toward a seal which is to be maintained free of debris. For example, conventional jet engine applications typify such a type of utilization. Additionally, the stationary housing may be a counter-rotating member as in certain type of gas turbine installations, yet the swirling effect which tends to remove entrained debris will be maintained.

I claim:

1. In apparatus for preventing entry of debris into an engine along a rotating shaft;
 - a sealing comprising a non-rotating member biased into engagement with a seat rotating with said shaft;
 - a housing having a bore for receiving said shaft;
 - a first series of teeth on said rotating shaft defining a first helical-shaped grooved pattern, said first helical-shaped pattern having a pumping direction toward said seal so that rotation of said shaft pumps the pressurizing gas toward said seal while inducing a swirl motion whereby entrained debris is centrifuged outward; and
 - a second series of teeth in said bore spaced outward from said rotating shaft defining a second helical-shaped grooved pattern, the space between said rotating shaft and said housing defining a chamber for said seal pressurizing gas with said first and said second series of teeth forming opposed walls of said chamber which provides the sole passage for circulation of said seal pressurizing gas to and from said seal, said second grooved pattern having a pumping direction opposite to that of said first helical-shaped grooved pattern whereby the centrifuged debris is pumped away from said seal.

2. The apparatus of claim 1 wherein said housing is a stationary shaft housing of said engine.

3. The apparatus of claim 1 wherein said housing is a counter-rotating shaft and said second series of teeth is inside said counter-rotating shaft.

* * * * *